Patented Feb. 9, 1926.

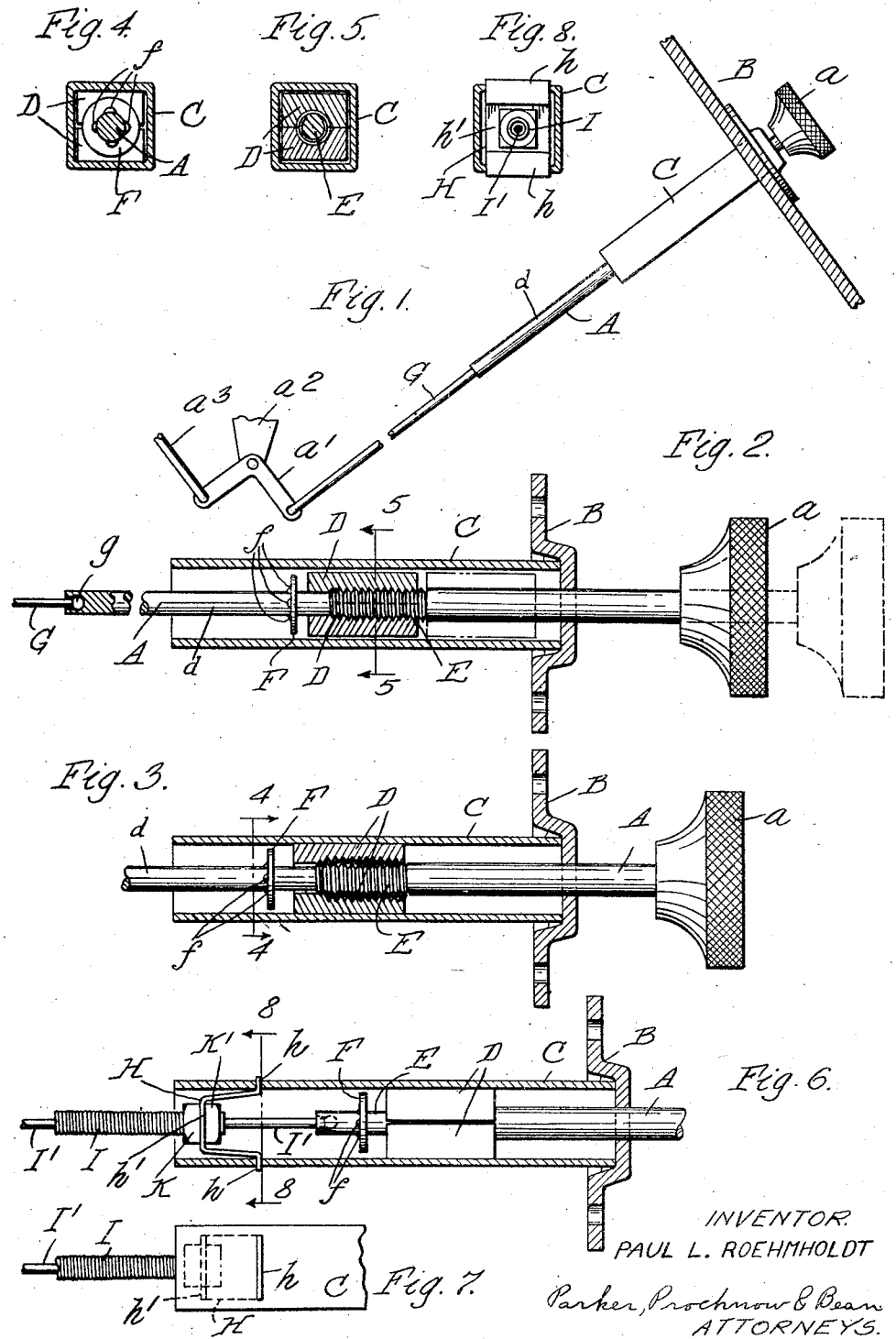

1,572,087

UNITED STATES PATENT OFFICE.

PAUL L. ROEHMHOLDT, OF BUFFALO, NEW YORK, ASSIGNOR TO IRVING ENGINEERING SALES COMPANY, OF BUFFALO, NEW YORK.

LOCKING DEVICE FOR SLIDABLE RODS.

Application filed August 12, 1924. Serial No. 731,683.

*To all whom it may concern:*

Be it known that I, PAUL L. ROEHMHOLDT, a citizen of the United States, residing at Buffalo, in the county of Erie and State of New York, have invented a new and useful Improvement in Locking Devices for Slidable Rods, of which the following is a specification.

This invention relates to devices by means of which slidable rods may be locked or held against sliding, and more particularly to devices of this kind in which the rod may be locked against sliding by a turning of the rod itself.

The objects of this invention are to provide an improved device of this kind which is of simple and efficient construction and which may be readily locked or released by a partial turn of the rod; also to provide means of improved construction for connecting a wire or extension rod with the slidable rod in such a manner that the turning of the slidable rod is not transmitted to said wire or extension rod; also to provide means of improved construction for connecting a device of this kind with a flexible conduit containing a wire slidable lengthwise therein for actuating a member arranged at a distance from the slidable rod; also to improve the construction of locking devices of this kind in other respects hereinafter specified.

In the accompanying drawings:

Fig. 1 is a side elevation of an adjusting or locking device embodying the invention, for securing a slidable rod in a fixed position.

Fig. 2 is a central sectional view thereof on an enlarged scale, showing the locking device released.

Fig. 3 is a similar view thereof showing the parts of the locking device in their locked position.

Fig. 4 is a transverse section thereof on line 4—4, Fig. 3.

Fig. 5 is a transverse section thereof on line 5—5, Fig. 2.

Fig. 6 is a longitudinal sectional view thereof showing the housing of the locking device connected with a flexible conduit and showing the slidable rod connected with a wire extending out of the conduit.

Fig. 7 is a fragmentary side elevation thereof.

Fig. 8 is a section on line 8—8, Fig. 6.

A represents a rod which is slidable in the direction of its length in a plate or guide member B having a hole therein through which the rod extends, and $a$ represents a handle or knob on the end of the rod A by means of which the rod may be adjusted as desired. The rod may be used for any desired purpose, for example, for adjusting the choke valve of an internal combustion engine, for opening and closing the radiator shutters of an automobile, or for any other desired purpose. In the construction shown in Fig. 1, the rod is connected with one arm of a bell crank lever $a'$, which is suitably pivoted on a fixed part $a^2$, and the other arm is connected with a rod $a^3$ whereby the longitudinal movement of the rod A is transmitted in another direction. Any other means for transmitting the movement of the rod A may be employed, if desired.

In many instances where a rod of this kind is employed, it is desired to provide means for holding the rod in any position in which it is set, and for this purpose, in the construction shown, a guide device or tube C, having a bore of non-circular cross section, is provided in which an expansible member is arranged which may be expanded or contracted upon turning the rod A. A guide device of any other suitable construction may be employed if desired. The tube C, in the construction shown, is secured to the guide plate B or may be otherwise secured in a fixed position, and is substantially square in cross section, but a tube of any other non-circular cross section may be employed if desired. The expansible member which is adapted to engage with the inner face of the tube C, in the construction shown, is in the form of a split nut made in two or more longitudinally divided sections or parts D and provided with a hole extending substantially centrally of the expansible member, the greater portion of the hole being threaded so that a portion of the thread is formed on each section of the expansible member. The rod A is provided with a part $d$ which is substantially of the same diameter as the unthreaded portion of the hole in the split nut and the portion of larger diameter of the rod A adjacent to the reduced portion $d$ thereof is provided with a screw thread E which is adapted to engage the threads of the sections D of the expansible member. Consequently when the rod is in a direction to move the threaded portion of the rod into the threaded hole formed by the parts of the expansible member, these parts are separated or expanded as the thread E moves into engagement with the unthreaded portion of the expansible member, and are moved from the positions shown in Fig. 2 to those shown in Fig. 3, in which latter positions the parts D engage the sides of the tube C and thus frictionally hold the clamping device, as well as the rod A, against the movement in the direction of the length of the rod. The radial outward movement of the parts of the expansible member is consequently due to a wedging action caused by the threaded portion of the rod A of larger diameter, entering into the unthreaded portion of the expansible member, which is of smaller diameter, the wedging action being brought about by the powerful leverage afforded by the screw action. Consequently the outer faces of the expansible member can be pressed with great force into engagement with the inner face of the tubular guide member C and it is also very advantageous that the gripping or holding action is not exerted against the rod itself, but against the guide tube, so that the resistance to the turning of the rod A is not as great as the resistance to lengthwise movement of the rod.

The engagement of the threads of the rod A with the threads of the expansible member serves also to cause the expansible member to move lengthwise with the rod. Means are, however, preferably provided for preventing the turning of the rod to such an extent as to cause the threaded portion of the rod to move out of engagement with the expansible member, and for this purpose, in the construction shown suitable stop means, such, for example, as a stop washer F, is provided on the rod A adjacent to the smaller end of the tapering thread thereof, the stop washer being held against movement away from the threaded portion of the rod A by any suitable means, for example, by deforming the rod A in such manner as to produce projecting portions f thereon, which form stops to limit the movement of the stop washer F.

The rod A may be connected with an extension rod G in any suitable or desired manner. In the construction shown, the extension rod G is provided with a ball-shaped end portion g which is adapted to enter into a longitudinal, central hole formed in the end of the rod A, and after the ball has been placed into the hole, the ends of the rod A around the hole are compressed toward each other or contracted so as to retain the ball in the hole. This connection permits the rod A to be turned without turning the extension rod G. Any other means for connecting the slidable rod A with the part which is to be actuated may be employed, if desired.

It is frequently desired to use the adjustable or slidable rod A in connection with a wire slidably arranged in a conduit so that the longitudinal movement of the slidable rod A may be transmitted to the wire to cause the same to move lengthwise in the conduit. For this purpose, in the construction shown, the conduit is secured to the tube C and the end of the wire extending out of the conduit is secured to the end of the slidable rod A. As is shown in Figs. 6 to 8, the tube C is preferably provided at opposite sides with slots through which outwardly bent ends h of a spring strap or U-shaped bridge member H extend. This bridge member is preferably made of a flat strip of material bent into substantially U-shape and having its ends extending outwardly, and the base h' of the U-shaped portion of the securing strap is provided with a hole through which the conduit I may extend. A pair of nuts K and K' are provided which are threaded to engage with the spirally wound wire forming the conduit and these nuts are preferably arranged at opposite sides of the base of the U-shaped member so as to hold the conduit from moving through the hole in the U-shaped member in either direction. This U-shaped member is preferably made of springy or resilient material such as steel, and the base h' of the bridge member H, which is engaged by the nuts K and K', is preferably normally slightly curved or rounded so that it is straightened when the nuts are pressed against this base of the U-shaped member. The curve of the base of the bridge member is such that the straightening action of the base tends to press the sides of the U-shaped member outwardly so that the outwardly bent portions h of the U-shaped member are pressed into the slots in the tube and are held firmly in their operative positions in the slots. Consequently, the tightening of the nuts K K' serves the two-fold purpose of securing the conduit to the bridge member and locking the ends of the bridge member in the slots, and the resiliency of the base of the bridge member also serves to hold the nuts against loosening. Other means for securing the conduit to the tube may be employed is desired.

The end of a wire I' which extends beyond the conduit I may be secured to the end of the slidable rod A in the same manner that the extension rod G is secured to this member, namely by forming a ball-shaped end portion on the wire I' which enters into a hole in the end of the slidable rod A, the end of the rod being contracted to retain the ball-shaped portion of the wire I' in the hole and thus form a ball and socket connection between the slidable rod and the end of the wire. By means of this construction a very inexpensive and reliable connection is made between the end of the conduit and the wire with the respective parts of the tube and slidable rod.

The locking device described is easy to operate since a partial turn of the rod serves to lock or release the rod and the rod may be locked in any desired position. The locking device, furthermore, is of strong and rugged construction and comprises comparatively few parts, thus greatly facilitating the manufacture thereof.

I claim as my invention:

1. The combination of a member slidable in the direction of its length, a tube of non-circular cross-section into which said member extends, and an expansible member movable lengthwise in said tube and which is held against turning by the cross sectional shape of said tube, said expansible member and said slidable member having cooperating parts which expand said expansible member when said slidable member is turned, to cause said expansible member to frictionally engage said tube to hold said members against lengthwise movement.

2. The combination of a member slidable in the direction of its length, a tube into which said member extends, an expansible member movable lengthwise in said tube, means for holding said expansible member against turning in said tube, and a threaded portion on said slidable member which is adapted to cooperate with a correspondingly threaded portion of said expansible member to expand said member and move the same into frictional engagement with said tube to hold said slidable member against lengthwise movement.

3. The combination of a member slidable in the direction of its length, a tube into which said member extends, an expansible member movable lengthwise in said tube and comprising a plurality of parts, means for holding said expansible member against turning in said tube, said expansible member having a centrally disposed opening provided with a thread, a corresponding thread on said slidable member which is adapted to hold the parts of said expansible member in operative relation to each other and which has a part cooperating with said expansible member to move the parts of said member outwardly into frictional engagement with said tube when said slidable member is turned.

4. The combination of a rod having a threaded portion thereon, a longitudinally split nut having a threaded portion adapted to cooperate with the threaded portion of said rod, guide means in which said nut is movable lengthwise and held against turning, said threaded portions being arranged to cause the parts of the nut to move radially when the rod is turned, whereby the parts of the nut may engage said guide means to hold said rod and nut against lengthwise movement.

5. The combination of a rod movable lengthwise and having a threaded portion, a longitudinally split nut engaging the threaded portion of said rod, guide means in which said nut is movable lengthwise and held against turning, a stop on said rod for limiting the extent to which said nut may move longitudinally with reference to said rod, the threaded portion of said rod being adapted to move the parts of said nut radially into engagement with the guide means therefor to hold said rod and nut against longitudinal movement.

6. The combination of a rod movable lengthwise, a split nut arranged on said rod, said nut and rod having threaded portions which engage to cause the parts of the nut to be moved radially when said rod is turned, guide means for said nut, the parts of said nut being movable into engagement with said guide means when said rod is turned, and a stop collar adjacent to said threaded portion of said rod to limit the extent to which said nut may be moved lengthwise of said rod by the turning of said rod.

7. The combination of a rod movable lengthwise, a split nut arranged on said rod and having a threaded portion adapted to engage with a correspondingly threaded portion of said rod to cause the turning of said rod to move the parts of said nut radially, means adapted to be engaged by the parts of said nut when the same are moved radially, to hold said nut and rod against lengthwise movement, a stop collar on said rod, and means on said rod for limiting the movement of the stop collar to limit the extent to which said nut may be moved lengthwise of said rod.

8. The combination of a rod movable lengthwise and having a threaded portion, a longitudinally split nut having a correspondingly threaded portion engaging with the threaded portion of said rod, whereby the turning of the rod causes the parts of the nut to move radially, means adapted to be engaged by the parts of said nut when the same are moved radially, to hold said nut and rod against lengthwise movement, a stop collar on said rod adjacent to said threaded portion, and integral projections formed on said rod for limiting the movement of said collar lengthwise thereof, whereby the parts of said nut are held against movement out of engagement with said thread, the turning of said rod causing the portions of said nut to move radially into a locking position.

9. The combination of a rod movable lengthwise, a tube into which said rod extends and having laterally disposed recesses, means actuated by the turning of said rod for engaging the sides of said tube to hold said rod against movement, a conduit containing a wire movable lengthwise therein, a bridge member having its end secured in said recesses and having said conduit connected to the intermediate portion thereof, and means for connecting the end of said wire with said rod.

10. The combination of a rod movable lengthwise, a tube into which said rod extends and having laterally disposed recesses, means actuated by the turning of said rod for engaging the sides of said tube to hold said rod against movement, a conduit containing a wire movable lengthwise therein, a substantially U-shaped bridge member having end portions adapted to enter into said recesses and having a base arranged at a distance from said ends, means for securing said conduit to the base of said bridge member, and means for connecting said wire to said rod.

11. The combination of a rod movable lengthwise, a tube into which said rod extends and having laterally disposed recesses, means actuated by the turning of said rod for engaging the sides of said tube to hold said rod against movement, a conduit containing a wire movable lengthwise therein, a substantially U-shaped bridge member of resilient material having end portions adapted to enter said recesses and a base which is normally curved away from said ends and having a hole through which said conduit extends, means engaging said conduit and arranged at opposite sides of said base and adapted to be secured against the opposite faces of said curved base to secure said conduit to said base and to straighten the curvature of said base, whereby the ends of said U-shaped member are pressed into said recesses, and means for connecting said wire with said rod.

12. The combination of a rod slidable in the direction of its length and having an end portion of smaller diameter than the remaining portion of the rod and having a screw thread on said remaining portion adjacent to said portion of smaller diameter, a split nut having a thread extending through a portion thereof only and adapted to engage the threaded portion of said rod, the portion of said rod of smaller diameter being adapted to pass freely through the unthreaded portion of said split nut, and guide means for said split nut and with which the parts of said split nut are adapted to be moved into locking engagement when the threaded portion of said rod enters into the unthreaded portion of said split nut.

13. The combination of a rod slidable in the direction of its length, and having a threaded portion, a split nut having a thread extending only through a portion of said split nut, and guide means on which said split nut is movable lengthwise and with which said split nut may be moved into locking engagement when said threaded portion of said rod is turned to move said threaded portion into said unthreaded portion of said split nut.

14. The combination of a rod slidable in the direction of its length, an expansible member rotatably mounted on said rod and movable lengthwise therewith, guide means on which said expansible member is movable lengthwise when said rod is moved in the direction of its length and which hold said member against turning, and cooperating parts on said rod and on said expansible member whereby the turning of said rod causes said expansible member to be moved into locking engagement with said guide means.

15. The combination of a rod slidable in the direction of its length, an expansible member rotatably mounted on said rod and movable lengthwise therewith, guide means on which said expansible member is movable lengthwise when said rod is moved in the direction of its length, and which hold said member against turning, and a wedging connection between said rod and said expansible member whereby the turning of said rod in one direction causes said expansible member to grip said guide means to hold said rod against lengthwise movement.

16. The combination of a rod slidable in the direction of its length, an expansible member rotatably mounted on said rod and movable lengthwise therewith, guide means on which said expansible member is movable lengthwise when said rod is moved in the direction of its length, and which hold said member against turning, a wedge connection between said expansible member and said rod which acts to press said expansible member into gripping engagement with said guide means, and a screw threaded connection between said rod and said expansible member, whereby a turning of said rod causes the screw threads to actuate said wedge connection.

PAUL L. ROEHMHOLDT.